United States Patent
Tsai

(10) Patent No.: US 7,573,652 B2
(45) Date of Patent: Aug. 11, 2009

(54) FOCUSING DEVICE FOR DIGITAL CAMERA MODULE

(75) Inventor: Tien-Wu Tsai, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/953,692

(22) Filed: Dec. 10, 2007

(65) Prior Publication Data

US 2009/0027784 A1 Jan. 29, 2009

(30) Foreign Application Priority Data

Jul. 23, 2007 (CN) .................. 2007 1 0201153

(51) Int. Cl.
*G02B 15/14* (2006.01)
*G02B 7/02* (2006.01)
(52) U.S. Cl. .................. 359/696; 359/704; 359/823
(58) Field of Classification Search ......... 359/694–704, 359/811, 815, 819, 822–824
See application file for complete search history.

(56) References Cited

U.S. PATENT DOCUMENTS

| 5,805,353 | A | * | 9/1998 | Ichino et al. ............. 359/699 |
| 6,023,376 | A | * | 2/2000 | Nomura et al. ........... 359/694 |
| 2005/0104995 | A1 | * | 5/2005 | Spryshak et al. .......... 348/360 |

* cited by examiner

*Primary Examiner*—Ricky L Mack
*Assistant Examiner*—Mahidere S Sahle
(74) *Attorney, Agent, or Firm*—Zhigang Ma

(57) ABSTRACT

A focusing device (100) includes a lens mount (10), a driving mechanism (30), a hollow first barrel (50) and a first lens element (60) received in the first barrel. The lens mount includes a hollow sleeve (13) which includes a wall, a first internal thread on an inside of the wall and a cutout (134) defined through the wall. The hollow first barrel includes a wall, and a first outer thread (571) and an annular gear (55) on an outside of the wall. The first barrel is movably secured in the lens mount by means of the first outer thread engaging with the first internal thread, the driving mechanism protrudes through the cutout of the lens mount to drive the annular gear to rotate in the lens mount so that the first barrel ascends or descends relative to the lens mount.

17 Claims, 6 Drawing Sheets

FOCUSING DEVICE FOR DIGITAL CAMERA MODULE

BACKGROUND OF THE INVENTION

1. Field of the Invention

The present invention relates generally to a focusing device, and more particularly, to an automatic focusing device providing automatic focusing function and being typically used in a digital camera module.

2. Description of Related Art

In a digital camera, a focusing device is one kind of mechanism which can be used for adjusting a distance between the lens element and the image pickup device. Thereby, when photographing objects at different distances from the camera, a clear image is obtained. A typical focusing device of a camera includes a driving mechanism, a lens mount, a lens barrel, and a lens element received in the lens barrel. A curved guiding groove is often defined in an engaging interface between the lens barrel and the lens mount. The driving mechanism drives the lens barrel to move along the guiding groove relative to the lens mount so that a distance between the lens element and an image pickup device is changed. However, the curved guiding groove is difficult to make. That is, manufacturing of the guiding groove is both time-consuming and expensive.

What is needed, therefore, is a focusing device of a camera having a simple structure.

SUMMARY OF THE INVENTION

A focusing device comprises a lens mount, a driving mechanism, a hollow first barrel and a first lens element received in the first barrel. The lens mount comprises a hollow sleeve which comprises a wall, a first internal thread on an inside of the wall and a cutout defined through the wall. The driving mechanism comprises a motor and a driving gear. The hollow first barrel comprises a wall, and a first outer thread and an annular gear on an outside of the wall. The first barrel is movably secured in the lens mount by means of the first outer thread engaging with the first internal thread, the driving mechanism protrudes through the cutout of the lens mount and is engaged with the annular gear, and the motor drives the driving gear to drive the annular gear to rotate in the lens mount so that the first barrel ascends or descends relative to the lens mount.

Other novel features and advantages of the present focusing device will become more apparent from the following detailed description of preferred and exemplary embodiments when taken in conjunction with the accompanying drawings, in which:

DETAILED DESCRIPTION OF THE INVENTION

Figure 1:
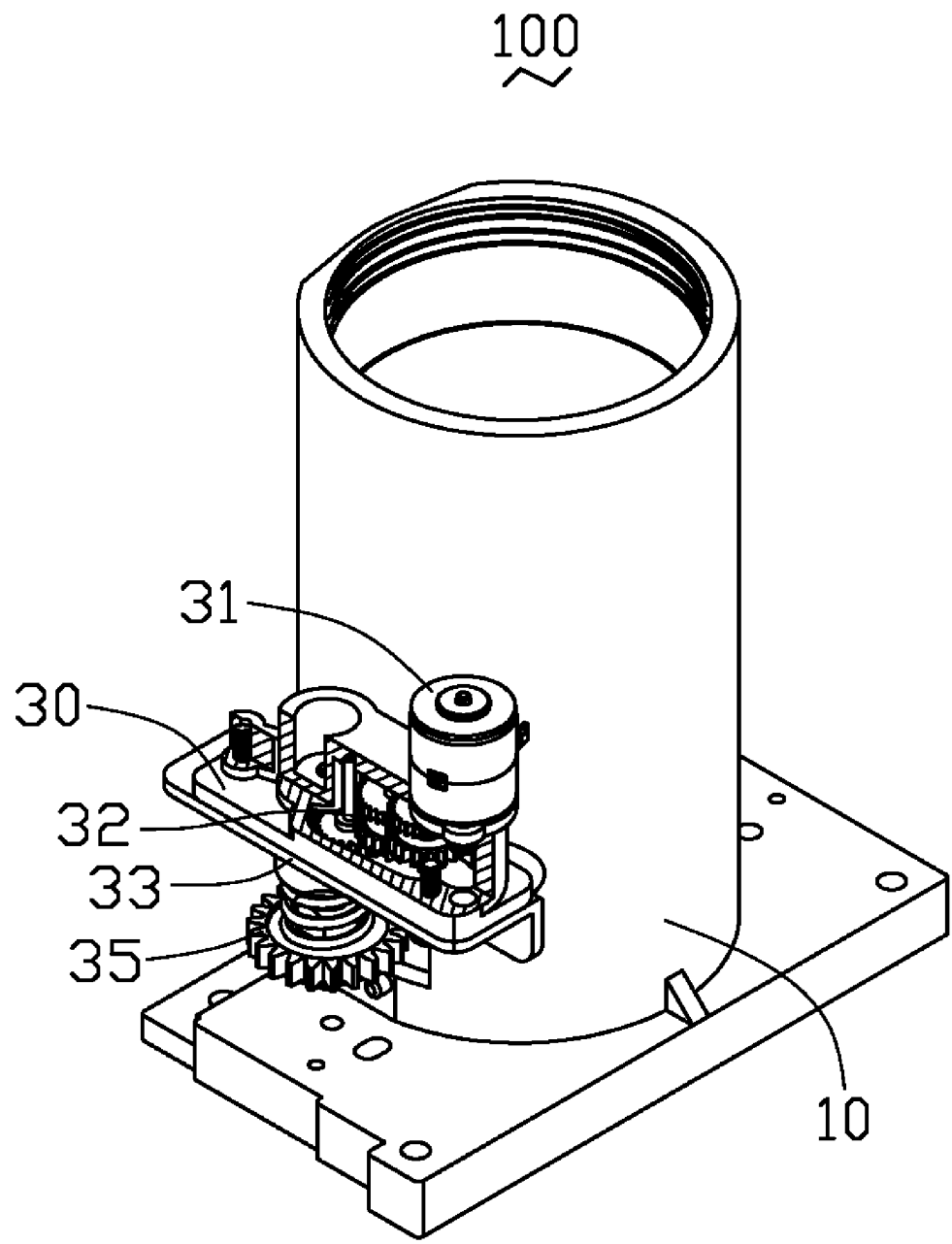
FIG. 1 is an isometric view of a focusing device used in a camera in accordance with a preferred embodiment of the present invention, showing part of the focusing device cut away.
Figure 2:
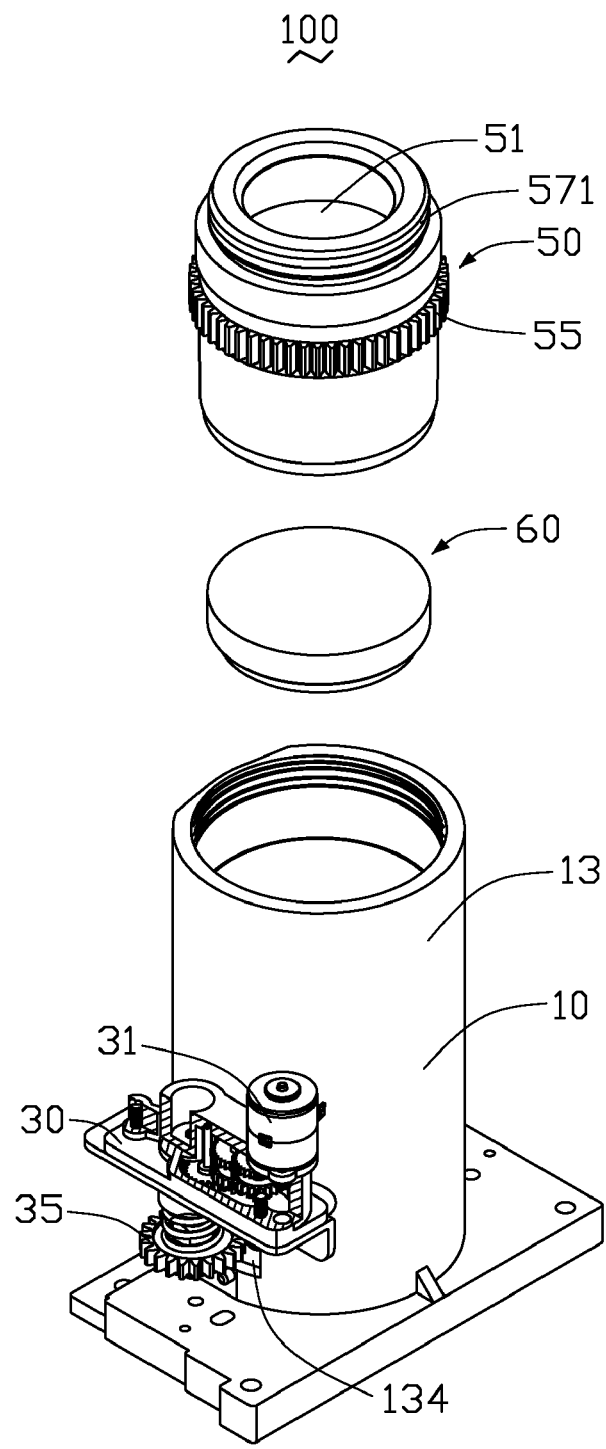
FIG. 2 is an exploded view of the focusing device shown in FIG. 1.

Referring to FIG. 1 and FIG. 2, a focusing device 100 in accordance with a preferred embodiment of the present invention is shown. The focusing device 100 is typically used in a digital camera (not shown). The focusing device 100 comprises a lens mount 10, a driving mechanism 30 located outside the lens mount 10, a first barrel 50 received in the lens mount 10, and a first lens element 60 engaged in the first barrel 50.

The driving mechanism 30 comprises a motor 31, a reduction gear assembly 32, a fixing board 33, and a driving gear 35. The fixing board 33 is secured to the lens mount 10, The motor 31, the reduction gear assembly 32, and the driving gear 35 are mounted to the fixing board 33. The motor 31 is used to provide driving force. The reduction gear assembly 32 comprises a plurality of gears, and transfers the driving force of the motor 31 at a slower speed to the driving gear 35.

Figure 3:
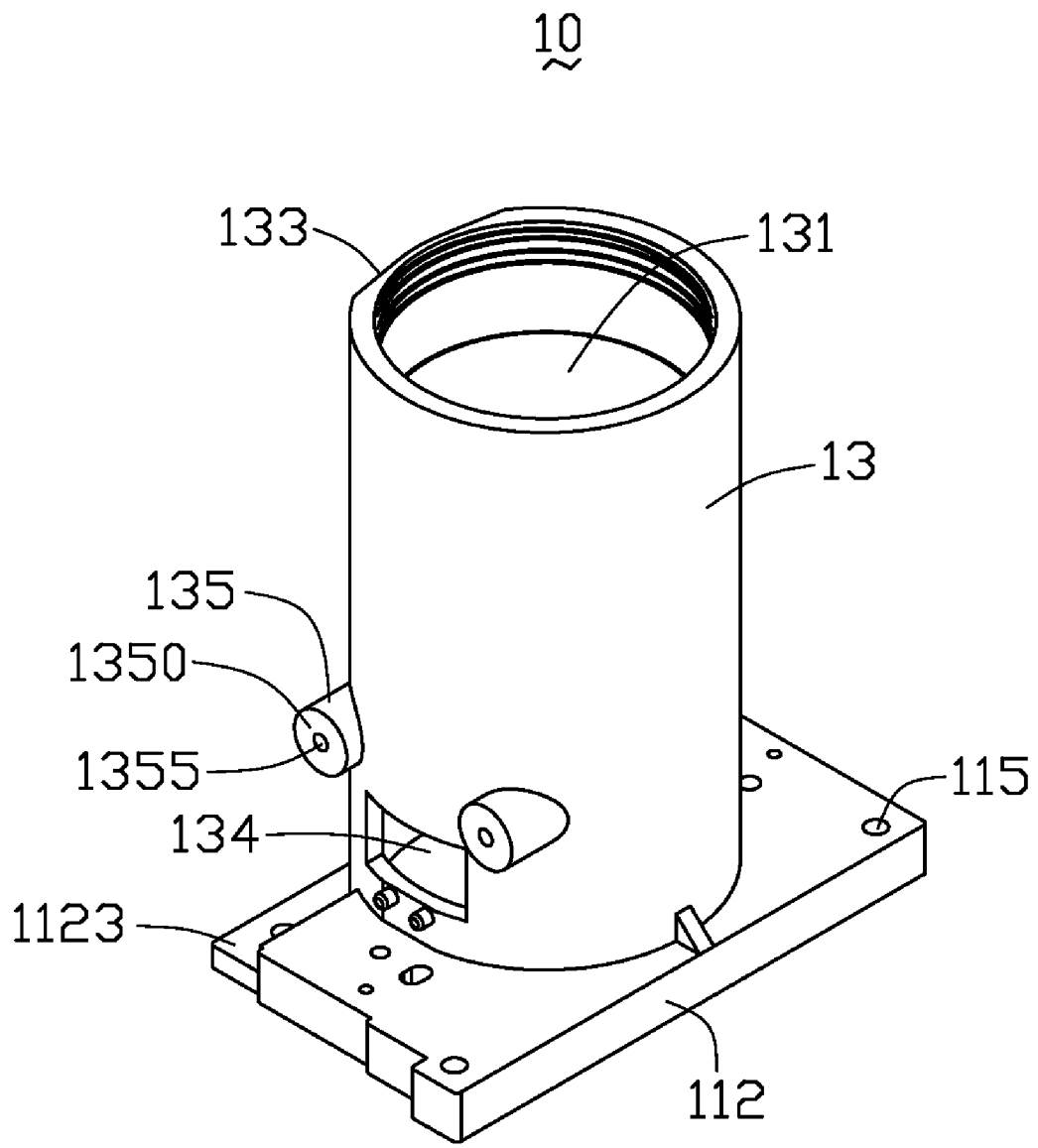
FIG. 3 is an isometric view of a lens mount of the focusing device of FIG. 1.

Referring also to FIG. 3, the lens mount 10 comprises a base board 112 and a sleeve 13 extending upwardly from a top surface of the base board 112. The base board 112 is substantially rectangular and comprises a sidestep 1123 at a lateral side thereof. A top surface of the sidestep 1123 is lower than a top surface of the base board 112. A plurality of holes 115 are defined in the base board 112 and the sidestep 1123 for connecting the lens mount 10 with the digital camera using the focusing device 100. The sleeve 13 is generally a hollow cylinder. A receiving hole 131 extends through the lens mount 10, from a top of the sleeve 13 to a bottom of the base board 112. The sleeve 13 has a plane 133 at a lateral side thereof. The plane 133 is adjacent to the sidestep 1123, and is formed by cutting a portion of an outside wall of the sleeve 13 along a direction parallel to an axis of the sleeve 13. A small cutout 134 is defined in the outside wall of the sleeve 13 corresponding to the driving gear 35, and communicates with the receiving hole 131 of the sleeve 13. Around the cutout 134, two cylinders 135 extend outwardly from the outside wall of the sleeve 13 for connecting with the fixing board 33. Each cylinder 135 has a fixing plane 1350 and a fixing hole 1355.

Figure 4:
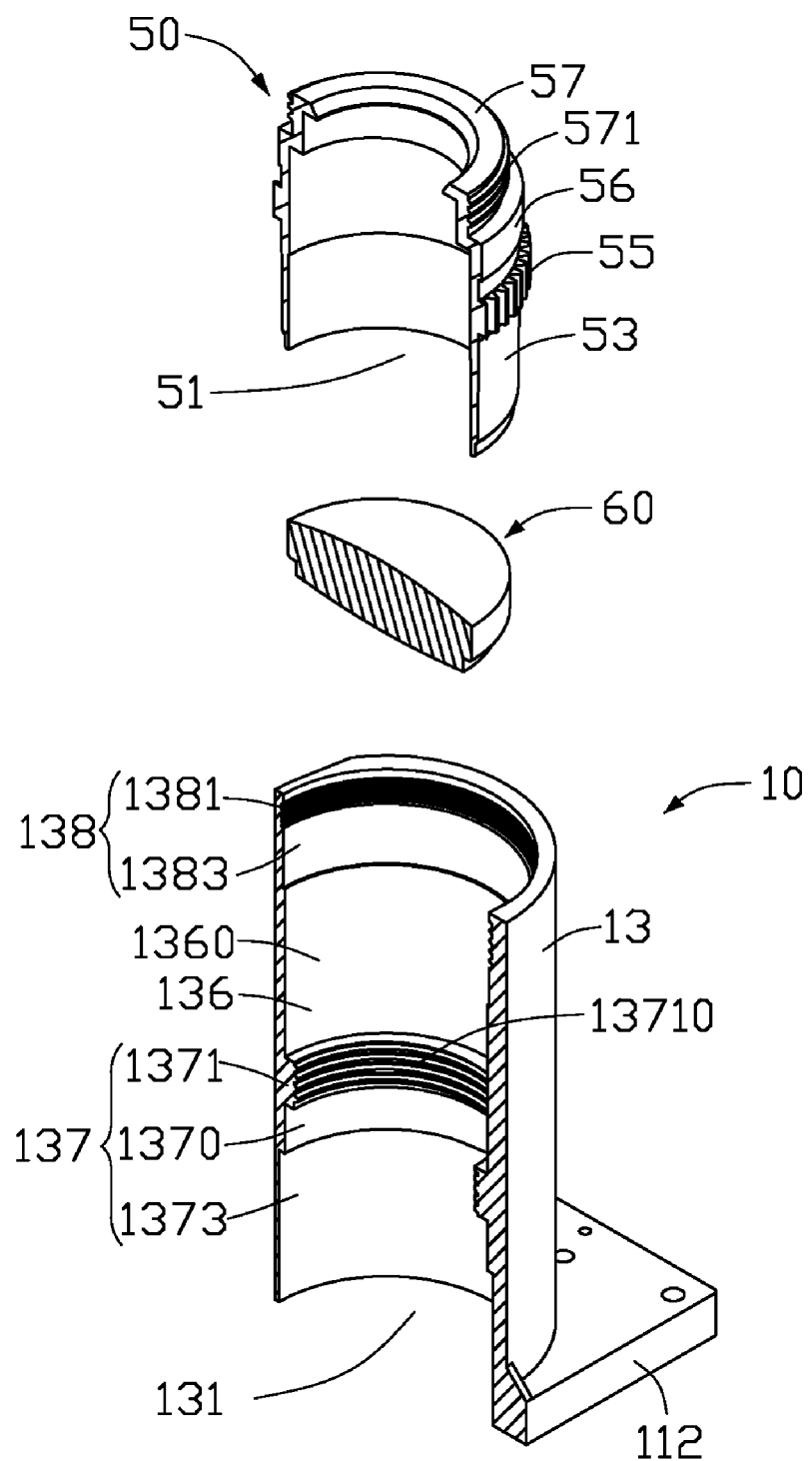
FIG. 4 is a cutaway view of the focusing device of FIG. 2.

Referring also to FIG. 4, a bushing 136 is formed on an inside wall of the sleeve 13. The bushing 136 projects a short distance radially and inwardly towards the axis of the sleeve 13. The bushing 136 is formed integrally with the sleeve 13, from a middle portion to an upper portion of the sleeve 13. Two axial ends of the bushing 136 are respectively spaced from two axial ends of the sleeve 13. A inner surface 1360 of the bushing 136 is smooth. An annular step 1371 protrudes radially and inwardly from the inner surface 1360 of the bushing 136. The annular step 1371 defines a first internal thread 13710 therein. The annular step 1371 is spaced from the two axial ends of the bushing 136, so that a portion of the bushing 136 below the annular step 1371 forms a collar part 1370. A portion of the sleeve 13 below the bushing 136 forms a thin wall 1373. The thin wall 1373 extends downwardly from a bottom of the bushing 136 to the base board 112. The annular step 1371, the collar part 1370 and the thin wall 1373 cooperatively form a first engaging portion 137 used for receiving the first barrel 50.

A portion of the sleeve 13 above the bushing 136 forms a second engaging portion 138. The second engaging portion 138 comprises a collar part 1383 extending from a top of the bushing 136, and a second internal thread 1381 between the collar part 1383 and the top of the sleeve 13.

The first barrel 50 is a hollow cylinder having a through hole 51 therein. The through hole 51 comprises a plurality of shorter holes each having different internal diameters. Each hole can receive the first lens element 60, depending on a size of the first lens element 60. That is, different first lens elements 60 having different outer diameters can be arranged in an appropriate one of different axial positions of the first barrel 50 according to need. The first lens element 60 can be connected with the first barrel 50 by means of adhesive. An outside wall of the first barrel 50 forms a plurality of steps for engaging with the inside wall of the sleeve 13. A top portion of the first barrel 50 is shaped to form an annular part 57. The annular part 57 has a first outer thread 571 defined on an outside wall thereof. The annular part 57 is engaged with the annular step 1371 of the sleeve 13, with the first outer thread 571 engaging with the first internal thread 13710. Below the annular part 57, a collar step 56 with an outer diameter larger than the annular part 57 is formed. The outer diameter of the collar step 56 is substantially same as an internal diameter of the collar part 1370, and has a smooth outside surface. The collar step 56 abuts against the collar part 1370 and ensures the first barrel 50 and the sleeve 13 are mounted on a common axis. A thin wall 53 extends downwardly from a bottom of the collar step 56. An annular gear 55 is formed on an outside of the thin wall 53.

Figure 6:
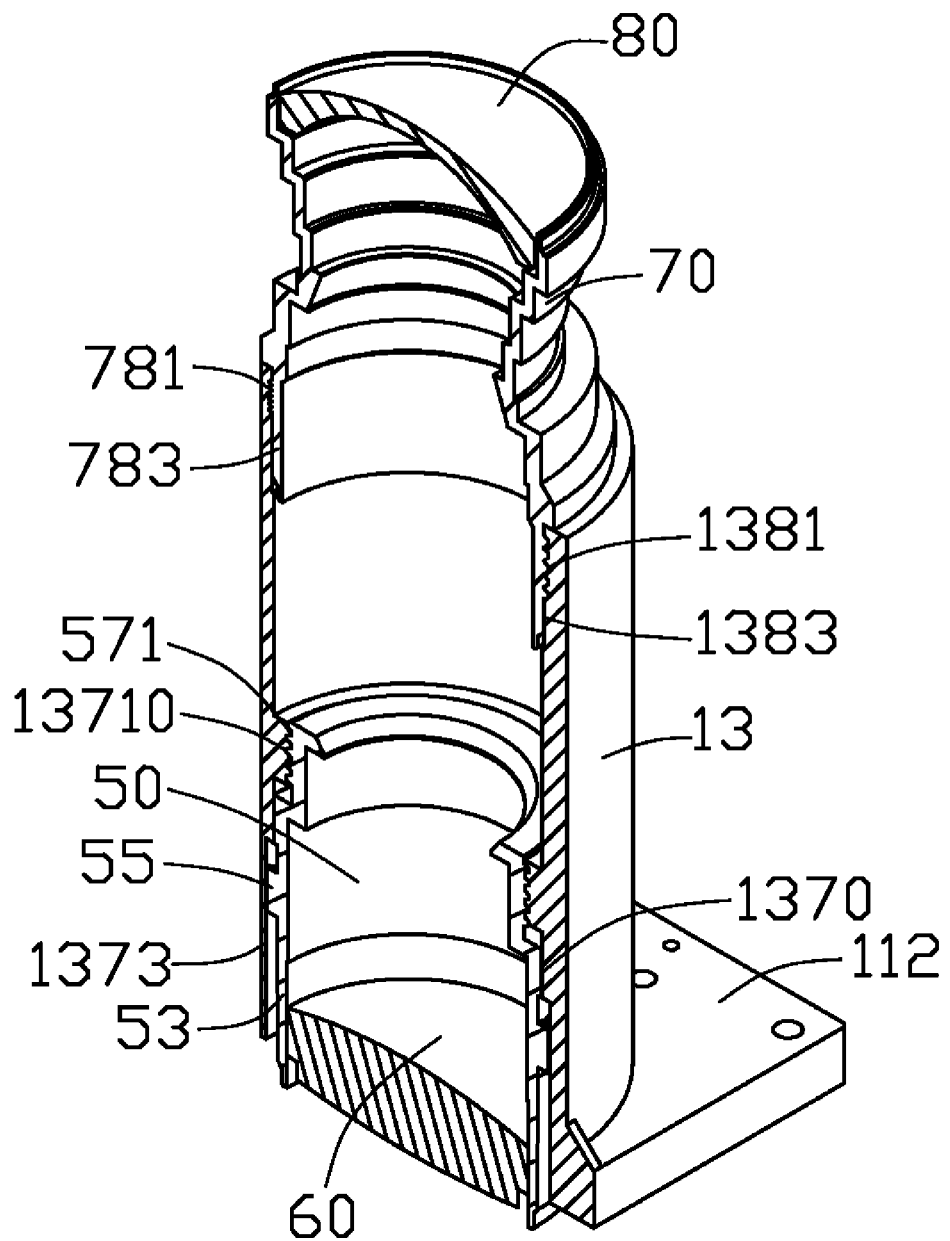
FIG. 6 is an assembled, cutaway view of the focusing device of FIG. 5.

Referring also to FIG. 6, in assembly, the first lens element 60 is engaged in a bottom of the through hole 51 of the first barrel 50. A distance between the first lens element 60 and a bottom of the first barrel 50 can be adjusted according to need. The first barrel 50 is vertically engaged in the first engaging portion 137 of the lens mount 10 by means of the first outer thread 571 engaging with the first internal thread 13710. The collar step 56 of the first barrel 50 abuts against the collar part 1370 of the sleeve 13, and the thin wall 53 of the first barrel 50 is encircled by the thin wall 1373 of the sleeve 13. The annular gear 55 opposes the cutout 134, for engaging with the driving gear 35 of the driving mechanism 30. The driving mechanism 30 is secured to the lens mount 10 via the fixing board 33, with the driving gear 35 protruding through the cutout 134 and engaging with the annular gear 55 of the first barrel 50. In use, the driving gear 35 is driven by the motor 31, and drives the annular gear 55 of the first barrel 50 to rotate in the lens mount 10. Accordingly, due to the engaging of the threads 571, 13710, the first barrel 50 ascends or descends to a predetermined position in the lens mount 10 so that a distance between the first lens element 60 and an image pickup device (not shown) under the lens mount 10 can be adjusted. Thus, a focus of the camera can be changed. An axial height of the annular gear 55 is preferably greater than that of the driving gear 35, in order to prevent the driving gear 35 from disengaging from the annular gear 55 when the first barrel 50 ascends or descends. Thus, a focus distance of the camera can be adjusted according to need. When taking pictures, the light reflected from an object (not shown) passes through the receiving hole 131, the first barrel 50, and the lens element 60 to form a clear image in the image pickup device under the lens element 60.

Figure 5:
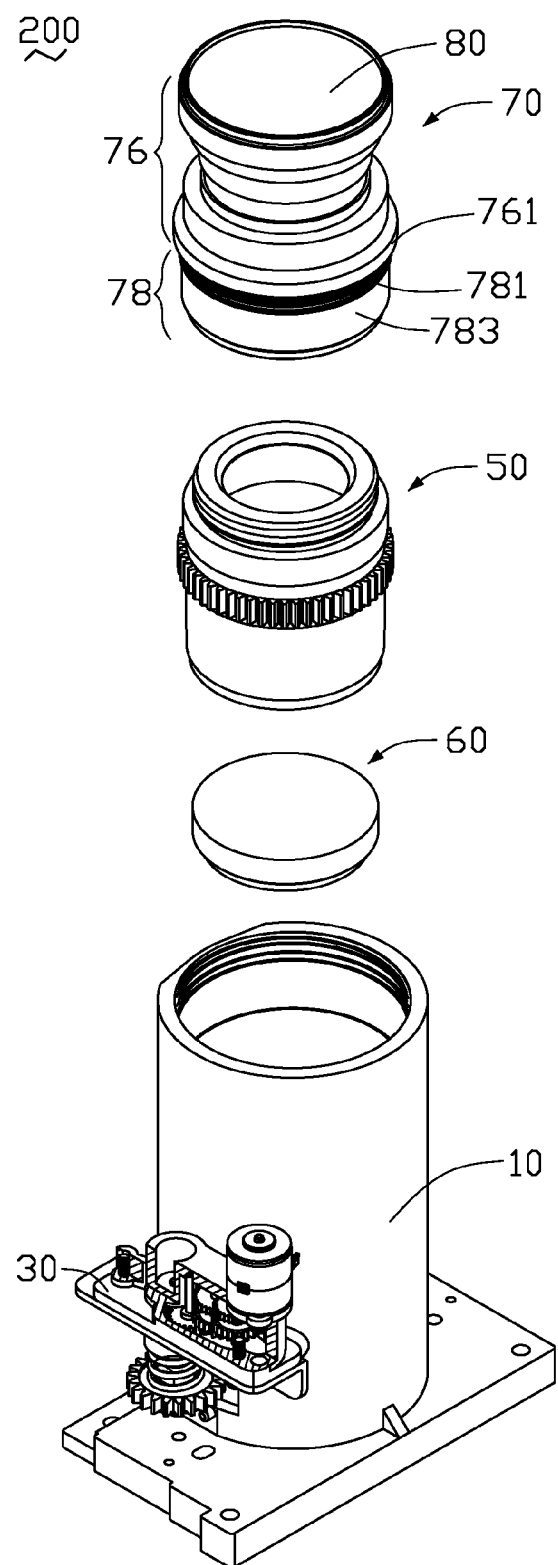
FIG. 5 is an exploded, isometric view of a focusing device used in a camera in accordance with a second embodiment of the present invention, showing part of the focusing device cut away.

Referring to FIG. 5 and FIG. 6, a focusing device 200 in accordance with a second embodiment of the present invention is shown. The focusing device 200 comprises the lens mount 10, the driving mechanism 30, the first barrel 50 and the first lens element 60, which are same as those of the focusing device 100. The difference is that the focusing device 200 further comprises a second barrel 70 and a second lens element 80. The second barrel 70 has a stepped portion 76, and an engaging portion 78 below the stepped portion 76. The stepped portion 76 comprises a plurality of internal annular steps arranged along an axial direction thereof. The internal annular steps correspondingly define a plurality of holes with different internal diameters. Each of the holes of the stepped portion 76 can receive the second lens element 80, depending on a size of the second lens element 80. That is, different second lens elements 80 having different outer diameters can be arranged in an appropriate one of different axial positions of the second barrel 70 according to need. The engaging portion 78 comprises a second outer thread 781 and a collar step 783 formed on an outside wall thereof, corresponding to the second internal thread 1381 and the collar part 1383 of the lens mount 10 respectively. An outer annular step 761 having a larger diameter than the engaging portion 78 is formed at a bottom of the stepped portion 76, adjacent to the engaging portion 78. In assembly, an outside wall of the collar step 783 abuts against the collar part 1383, the second outer thread 781 engages with the second internal thread 1381, and a bottom of the annular step 761 abuts against the top of the sleeve 13, as shown in FIG. 6. The second lens element 80 opposes the first lens element 60 in the axial direction of the sleeve 13. The first barrel 50 is driven to rotate in the lens mount 10 and ascends or descends relative to the second barrel 70, so that the distance between the lens element 60 and the lens element 80 can be changed. Each of the lens elements 60, 80 can for example be one of an optical lens, a spherical lens, an aspheric lens, and a filter lens. The first barrel 50 maintains a distance from the second barrel 60; and the distance between the first barrel 50 and the second barrel 60 can be adjusted according to need.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A focusing device comprising:
a lens mount comprising a hollow sleeve, the hollow sleeve comprising a wall, a bushing integrally formed on an inside of the wall of the sleeve, an annular step protruding radially and inwardly from an inner surface of the bushing, a portion of the bushing below the annular step forming a collar part, a first internal thread defined in the annular step; and a cutout defined through the wall;
a driving mechanism comprising a motor and a driving gear;
a hollow first barrel comprising a wall, a top portion of the first barrel forming an annular part, a collar step formed on an outside of the wall of the first barrel below the annular part, the collar step abutting against the collar part, and the annular part defining a first outer thread and an annular gear on the outside of the wall of the first barrel below the collar step; and
a first lens element received in the first barrel;
wherein the first barrel is movably secured in the lens mount by means of the first outer thread engaging with the first internal thread, the driving mechanism protrudes through the cutout of the lens mount and is engaged with the annular gear, and the motor drives the driving gear to drive the annular gear to rotate in the lens mount so that the first barrel ascends or descends relative to the lens mount.

2. The focusing device as described in claim 1, wherein the sleeve of the lens mount comprises a receiving hole extending through the sleeve.

3. The focusing device as described in claim 1, wherein the bushing is positioned from a middle to an upside of the sleeve, and two axial ends of the bushing are respectively spaced from two axial ends of the sleeve.

4. The focusing device as described in claim 1, wherein, as for the sleeve, a portion of the sleeve below the bushing forms a thin wall, the annular step, the collar part and the thin wall cooperatively forms a first engaging portion for receiving the first barrel.

5. The focusing device as described in claim 1, wherein, as for the first barrel, a thin wall extends downwardly from a bottom of the collar step and the annular gear is formed on an outside of the thin wall.

6. The focusing device as described in claim 1, wherein a top end of the sleeve forms a second engaging portion comprising a collar part and a second internal thread defined in the collar part.

7. The focusing device as described in claim 6, wherein the focusing device further comprises a second barrel and a second lens element received in the second barrel.

8. The focusing device as described in claim 7, wherein the second barrel comprises a stepped portion and an engaging portion, the stepped portion comprises a plurality of internal annular steps forming a plurality of holes therein with different internal diameters, the engaging portion comprises a second outer thread and a collar step respectively corresponding to the second internal thread and the collar part of the second engaging portion of the sleeve.

9. The focusing device as described in claim 7, wherein each of the lens elements is selected from the group consisting of an optical lens, a spherical lens, an aspheric lens, and a filter lens.

10. The focusing device as described in claim 1, wherein the lens mount further comprises a base board used for securing the lens mount, the sleeve extends upwardly from the base board, and the receiving hole extends the lens mount from a top of the sleeve to a bottom of the base board.

11. The focusing device as described in claim 1, wherein the first barrel comprises a plurality of holes having different internal diameters along an axial direction thereof.

12. The focusing device as described in claim 1, wherein the driving mechanism further comprises a reduction gear assembly and a fixing board, the fixing board is used to connect the driving mechanism with the lens mount, and the reduction gear assembly is used to reduce speed of the motor.

13. A focusing device comprising:
a lens mount comprising a hollow sleeve, the hollow sleeve comprising a wall, a bushing integrally formed on an inside of the wall of the sleeve, a first internal thread formed on the bushing and a second internal thread formed on a portion of the sleeve above the bushing, and a cutout defined through the wall;
a driving mechanism comprising a driving gear;
a first lens barrel and a second lens barrel, each comprising an outer thread on an outside wall thereof and defining a through hole, a collar step formed on an outside of the wall of the first lens barrel and the bushing abutting against the collar step; and
a first lens element and a second lens element received in the first and second lens barrels, respectively;
wherein the first and second lens barrels are distanced from each other and secured to the lens mount by means of the outer threads engaging with the internal threads respectively, the first lens barrel has an annular gear formed on the outside wall thereof, the driving gear of the driving mechanism protrudes through the cutout of the lens mount and engages with the annular gear, and the driving gear is configured to drive the annular gear to rotate in the lens mount so that the first lens barrel ascends or descends relative to the second lens barrel.

14. The focusing device as described in claim 13, wherein the sleeve of the lens mount is approximately a cylinder and comprises a receiving hole extending through two ends thereof, and the first and second lens barrels are vertically received in the receiving hole.

15. The focusing device as described in claim 13, wherein the through hole of each of the first and second lens barrels comprises a plurality of holes therein having different internal diameters along an axial direction thereof for receiving lens elements having different outer diameters.

16. The focusing device as described in claim 13, wherein an annular step protrudes radially and inwardly from an inner surface of the bushing, the first internal thread is defined in the annular step, and an annular part is formed on the outside wall of the first barrel and defines the outer thread thereon.

17. The focusing device as described in claim 13, wherein a top end of the sleeve forms a engaging portion comprising a collar part and the second internal thread defined in the collar part.

* * * * *